Patented Dec. 6, 1932

1,890,154

UNITED STATES PATENT OFFICE

JOSEPH R. INGRAM, OF NITRO, WEST VIRGINIA, ASSIGNOR TO THE RUBBER SERVICE LABORATORIES COMPANY, OF AKRON, OHIO, A CORPORATION OF OHIO

ANTIOXIDANT FOR VULCANIZED RUBBER PRODUCTS

No Drawing.    Application filed November 13, 1930.    Serial No. 495,421.

The present invention relates to a process for the manufacture of vulcanized rubber and the products obtained thereby. More particularly, the invention is directed to the use in a rubber mix of an anti-oxidant or compound which imparts age resisting properties to the vulcanized rubber product.

It is well known that rubber deteriorates rapidly when exposed to air, heat and sunlight, and that such deterioration is characterized by a loss in the tensile strength, resiliency and other desirable properties of the material. It has been found according to the present invention that such deterioration can be very greatly lessened if there be incorporated in the rubber mix a compound of the class hereinafter set forth.

The age resisting characteristics of a vulcanized rubber product can be readily ascertained by subjecting the vulcanized product to an accelerated aging test wherein portions of the cured rubber product are subjected in a bomb to the action of oxygen under pressure and maintained for several hours at an elevated temperature. The treated samples are then examined and tested and the results so obtained compared with similar results obtained by testing the unaged vulcanized stock. The deterioration in properties suffered as a result of from 18 to 39 hours of the oxidation treatment at a pressure of 300 pounds of oxygen is indicative of the result that would normally be expected from that particular stock during approximately two years of natural aging. Such a test is known as the Bierer-Davis aging test.

The new class of anti-oxidants or age resisting materials which have been found upon incorporation into a rubber stock to impart such excellent age resisting qualities to the vulcanized product that portions thereof, when subjected to the artificial aging tests described, undergo only a relatively small loss in tensile strength and other qualities, comprises a reaction product of an amino substituted trithemyl-methane and an aryl hydroxide.

One method whereby one of the preferred class of anti-oxidants, for example, a reaction product of para-para-diamido-triphenyl-methane and beta-naphthol, was prepared follows:

Para-para-diamido-triphenyl-methane and beta-naphthol in the ratio of substantially one molecular proportion of the former compound to an excess over substantially two molecular proportions of the latter compound, were placed in a suitable container and heated, preferably in the presence of a catalyst or condensing agent, for example a small quantity of iodine, at a temperature of approximately 160 to 210° C. for substantially five to eight hours. After cooling to approximately 25° C., the excess of unreacted beta-naphthol was removed, preferably by washing with an alkaline solution and the residual product thus obtained was preferably washed with a dilute acid. It is thought that the reaction representing the preparation of the above compound proceeds as follows:

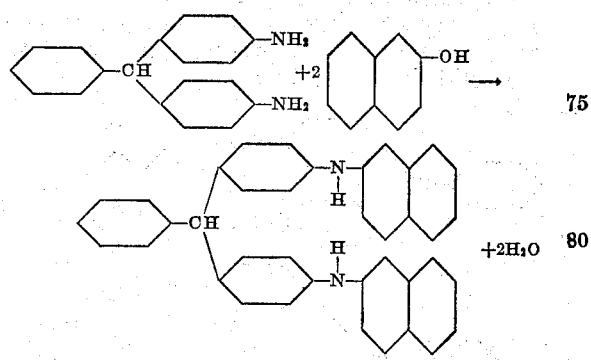

The material prepared as described was compounded in the well known manner in a rubber stock comprising

| | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenylguanidine | 1 |
| Anti-oxidant described above | 1 |

The stock thus formed was then vulcanized by heating sheets of the said stock in a press in the well known manner for different periods of time at the temperature given by 40 pounds of steam pressure per square inch. Portions of the stock cured in the manner as described were then artificially aged by heating in an oxygen bomb in the manner described for 39 hours at a temperature of 70° C. and an oxygen pressure of 300 pounds per square inch. A comparison between the tensile and modulus properties of the aged and unaged vulcanized rubber product so obtained is given in Table I.

Table I

| Cure minutes | Hours aged | Modulus of elasticity in lbs/in² at elongations of | | Tensile at break in lbs/in² | Ultimate elongation per cent |
|---|---|---|---|---|---|
| | | 300% | 500% | | |
| 30 | 0 | 833 | 2160 | 3210 | 660 |
| 30 | 39 | 896 | 1935 | 2290 | 585 |
| 60 | 0 | 1235 | 2995 | 4220 | 645 |
| 60 | 39 | 1230 | 2430 | 2770 | 575 |
| 90 | 0 | 1578 | 3455 | 4440 | 625 |
| 90 | 39 | 1400 | | 2465 | 480 |

The data set forth in Table I show that the preferred class of anti-oxidant materials, for example, the reaction product of para-para-diamido-triphenyl-methane and beta-naphthol, possess particularly desirable anti-oxidant properties.

Another example of the preferred class of anti-oxidants was prepared by reacting substantially one molecular proportion of para-para-diamido-triphenyl-methane with substantially two molecular proportions of alpha-naphthol in a manner analogous to that described above. It is thought that the reaction representing the preparation of the compound described proceeds according to the following equation:

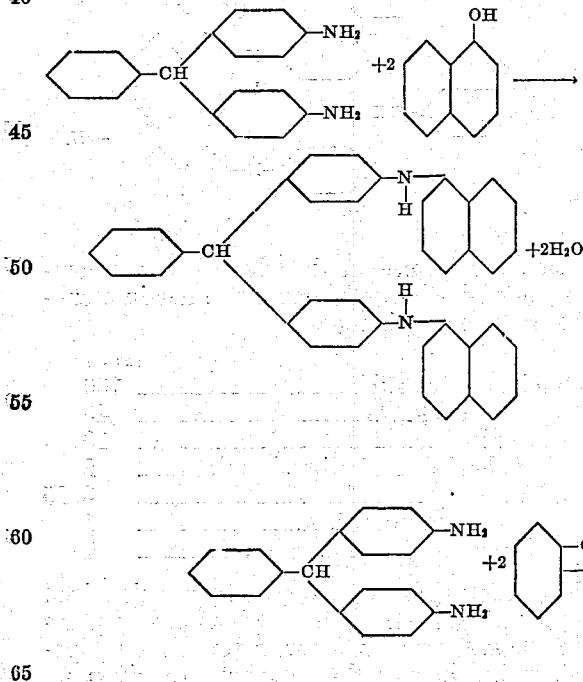

The product thus prepared was compounded in a rubber stock comprising

| | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenylguanidine | 1 |
| Anti-oxidant described above | 1 |

The stock was then vulcanized by heating for different periods of time at the temperature given by 40 pounds of steam pressure per square inch. Portions of the stock thus cured were then artificially aged by heating in an oxygen bomb in the manner hereinbefore described for 39 hours at a temperature of 70° C. and under an oxygen pressure of 300 pounds per square inch. A comparison between the tensile and modulus properties of the aged and unaged vulcanized rubber product is given in Table II.

Table II

| Cure minutes | Hours aged | Modulus of elasticity in lbs/in² at elongations of | | Tensile at break in lbs/in² | Ultimate elongation per cent |
|---|---|---|---|---|---|
| | | 300% | 500% | | |
| 30 | 0 | 878 | 2120 | 3105 | 620 |
| 30 | 39 | 1250 | 2360 | 2360 | 500 |
| 60 | 0 | 1130 | 2700 | 3820 | 650 |
| 60 | 39 | 1195 | 2240 | 2240 | 500 |
| 90 | 0 | 1300 | 2965 | 3750 | 600 |
| 90 | 39 | 1250 | 2360 | 2360 | 500 |

From the data set forth in Table II it is apparent that the reaction product of para-para-diamido-triphenyl-methane and alpha-naphthol possesses the desirable anti-oxidant properties of the preferred class of compounds.

Another example of the preferred class of anti-oxidants was prepared by reacting substantially one molecular proportion of para-para-diamido-triphenyl-methane with substantially two molecular proportions of phenol in a manner analogous to that described above. It is thought that the reaction representing the preparation of the above compound proceeds as follows:

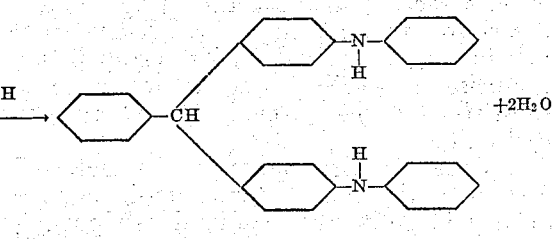

The compound thus prepared was incorporated in the well known manner in a rubber stock comprising

| | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenylguanidine | 1 |
| Anti-oxidant described above | 1 |

The compounded stock was then vulcanized by heating for different periods of time at the temperature given by 40 pounds of steam pressure per square inch. Portions of the stock thus cured were then artificially aged by heating in an oxygen bomb in the manner hereinbefore described for 39 hours at a temperature of 70° C. and under an oxygen pressure of 300 pounds per square inch. A comparison between the tensile and modulus properties of the aged and unaged vulcanized rubber product is given in Table III.

Table III

| Cure minutes | Hours aged | Modulus of elasticity in lbs/in² at elongations of | | Tensile at break in lbs/in² | Ultimate elongation per cent |
|---|---|---|---|---|---|
| | | 300% | 500% | | |
| 30 | 0 | 878 | 2180 | 3165 | 655 |
| 30 | 39 | 1265 | | 1870 | 445 |
| 60 | 0 | 1020 | 2550 | 3620 | 635 |
| 60 | 39 | 1035 | | 1813 | 480 |
| 90 | 0 | 1325 | 2985 | 4050 | 635 |
| 90 | 39 | 1265 | | 1870 | 445 |

From the data set forth in Table III it is apparent that the reaction product of para-para-diamido-triphenyl-methane and phenol possesses the desirable anti-oxidant properties of the preferred class of compounds in that the aged stock is materially better than a similar stock containing no anti-oxidant but aged in a like manner.

As further examples of operating the present invention, compounds were prepared by reacting substantially one molecular proportion of triamido-triphenyl-carbinol with substantially three molecular proportions of beta-naphthol and by reacting substantially one molecular proportion of para-magenta with substantially three molecular proportions of beta-naphthol, in a manner analogous to that hereinbefore described for the preparation of the above cited examples. The products formed were compounded in a rubber mix and tested in the manner hereinbefore described, and found to possess the desirable anti-oxidant qualities characteristic of the preferred class of materials.

In like manner, other aryl hydroxides than those described above may be reacted with an amino substituted triphenyl methane to form further examples of the preferred class of anti-oxidants. For example, diamido triphenyl methane, triamido triphenyl carbinol, para-magenta and the like may be reacted with resorcinol, pyrogallol, pyrocatechol, hydroquinone, hydro-naphtho-quinones, naphtho-resorcinol, and the like, and the products formed may be employed as anti-oxidants in a rubber stock of vulcanization characteristics.

In the examples hereinbefore set forth, diphenylguanidine was employed as the accelerator because it is known that a stock wherein it is employed possesses poor aging qualities. In fact, a tread stock of the composition employed in the examples cited, cured in the presence and under the influence of diphenylguanidine as an accelerator, but containing no anti-oxidant, melts down to a shapeless mass incapable of test when subjected to the aging test described. Other accelerators could, of course, have been employed in the tests hereinbefore described, resulting in different tensile and modulus figures than those hereinbefore set forth but still exhibiting the desirable anti-oxidant properties of the preferred class of compounds.

From the data hereinbefore set forth it is shown that the reaction products of an amino substituted triphenyl methane and an aryl hydroxide comprise an important class of anti-oxidants which have been employed advantageously in a rubber stock.

The present invention is limited solely by the claims attached hereto as a part of the present specification wherein it is intended to claim the invention as broadly as possible in view of the prior art.

What is claimed is:

1. The process of vulcanizing rubber which comprises heating rubber and sulfur in the presence of anti-oxidant comprising a reaction product of an amino substituted triphenyl-methane and an aromatic hydrocarbon, wherein one or more hydrogen atoms thereof are substituted by hydroxyl groups only.

2. The process of vulcanizing rubber which comprises heating rubber and sulfur in the presence of an anti-oxidant comprising a reaction product of a diamino substituted triphenyl-methane and an aromatic hydrocarbon, wherein one or more hydrogen atoms thereof are substituted by hydroxyl groups only.

3. The process of vulcanizing rubber which comprises heating rubber and sulfur in the presence of an anti-oxidant comprising a reaction product of para-para-diamido-triphenyl-methane and an aromatic hydrocarbon, wherein one hydrogen atom is substituted by a hydroxl group only.

4. The process of vulcanizing rubber which comprises heating rubber and sulfur in the presence of an anti-oxidant comprising a reaction product of para-para-diamido-triphenyl-methane and a naphthol.

5. The process of vulcanizing rubber which comprises heating rubber and sulfur in the presence of an anti-oxidant comprising a reaction product of para-para-diamido-triphenyl-methane and beta-naphthol.

6. The process of vulcanizing rubber which comprises heating rubber and sulfur in the presence of an anti-oxidant comprising a reaction product of substantially one molecular proportion of para-para-diamido-triphenyl-methane and substantially two molecular proportions of beta-naphthol.

7. The vulcanized rubber product prepared by heating rubber and sulfur in the presence of an anti-oxidant comprising a reaction product of an amino substituted triphenyl-methane and an aromatic hydrocarbon, wherein one or more hydrogen atoms thereof are substituted by hydroxyl groups only.

8. The vulcanized rubber product prepared by heating rubber and sulfur in the presence of an anti-oxidant comprising a reaction product of a diamino substituted triphenyl-methane and an aromatic hydrocarbon, wherein one or more hydrogen atoms thereof are substituted by hydroxyl groups only.

9. The vulcanized rubber product prepared by heating rubber and sulfur in the presence of an anti-oxidant comprising a reaction product of para-para-diamido-triphenyl-methane and an aromatic hydrocarbon, wherein one hydrocarbon atom is substituted by a hydroxyl group only.

10. The vulcanized rubber product prepared by heating rubber and sulfur in the presence of an anti-oxidant comprising a reaction product of para-para-diamido-triphenyl-methane and a naphthol.

11. The vulcanized rubber product prepared by heating rubber and sulfur in the presence of an anti-oxidant comprising a reaction product of para-para-diamido-triphenyl-methane and beta-naphthol.

12. The vulcanized rubber product prepared by heating rubber and sulfur in the presence of an anti-oxidant comprising a reaction product of substantially one molecular proportion of para-para-diamido-triphenyl-methane and substantially two molecular proportions of beta-naphthol.

13. The process of vulcanizing rubber which comprises heating rubber and sulfur in the presence of an anti-oxidant comprising a reaction product of an amino substituted triphenyl-methane and an aromatic hydrocarbon containing a single substituent, said substituent comprising a hydroxyl group.

14. The vulcanized rubber product prepared by heating rubber and sulfur in the presence of an anti-oxidant comprising a reaction product of an amino substituted tri-phenyl-methane and an aromatic hydrocarbon containing a single substituent, said substituent comprising a hydroxyl group.

15. The process of vulcanizing rubber which comprises heating rubber and sulfur in the presence of an anti-oxidant possessing the structural formula

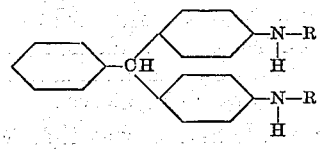

wherein R represents an aromatic hydrocarbon residue.

16. The vulcanized rubber product prepared by heating rubber and sulfur in the presence of an anti-oxidant possessing the structural formula

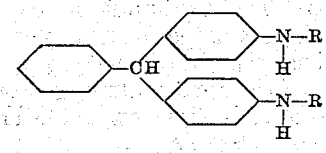

wherein R represents an aromatic hydrocarbon residue.

In testimony whereof I hereunto affix my signature.

JOSEPH R. INGRAM.

DISCLAIMER 1,890,154.—*Joseph R. Ingram*, Nitro, W. Va. ANTIOXIDANT FOR VULCANIZED RUBBER PRODUCTS. Patent dated December 6, 1932. Disclaimer filed March 6, 1935, by the assignee, *The Rubber Service Laboratories Company*.

Hereby disclaim that part of the claim in said specification which appears therein as claims 1, 2, 3, 7, 8, 9, 13, 14, 15 and 16 thereof.

Your petitioner further says that the subject matter not herein and hereby disclaimed is definitely distinguishable from the part or parts disclaimed herein and is truly and justly the invention of said Joseph R. Ingram and is a material and substantial part of the thing patented.

[*Official Gazette April 2, 1935.*]